United States Patent [19]

Podhrasky

[11] Patent Number: 4,700,139
[45] Date of Patent: Oct. 13, 1987

[54] METAL DETECTOR CIRCUIT HAVING SELECTABLE EXCLUSION RANGE FOR UNWANTED OBJECTS

[75] Inventor: Robert J. Podhrasky, Dallas, Tex.

[73] Assignee: Garrett Electronics, Inc., Garland, Tex.

[21] Appl. No.: 666,184

[22] Filed: Oct. 29, 1984

[51] Int. Cl.⁴ ............................................. G01V 3/10
[52] U.S. Cl. .................................. 324/329; 324/327; 324/233
[58] Field of Search .................. 524/326–329, 524/233–236, 239, 260; 331/65; 340/38 L, 551, 567, 941; 328/165, 132, 142

[56] References Cited

U.S. PATENT DOCUMENTS

| | | | |
|---|---|---|---|
| 3,676,772 | 7/1972 | Lee | 324/233 |
| 3,875,498 | 4/1975 | Mahan et al. | 324/328 |
| 4,030,026 | 6/1977 | Payne | 324/329 |
| 4,128,803 | 12/1978 | Payne | 324/329 |
| 4,303,879 | 12/1981 | Podhrasky | 324/329 |
| 4,325,027 | 4/1982 | Dykstra et al. | 324/329 |
| 4,344,034 | 8/1982 | Randolph, Jr. | 324/329 |
| 4,486,713 | 12/1984 | Gifford | 324/329 |
| 4,507,612 | 3/1985 | Payne | 324/329 |
| 4,514,692 | 4/1985 | Johnson et al. | 324/329 |
| 4,970,015 | 9/1984 | Hirschi et al. | 324/329 |

OTHER PUBLICATIONS

Corbyn, "Pulse Induction Metal Detector," *Wireless World*, vol. 86, No. 1531, Mar. 1980, pp. 40–44.

Primary Examiner—Reinhard J. Eisenzopf
Assistant Examiner—Warren S. Edmonds
Attorney, Agent, or Firm—Richards, Harris, Medlock & Andrews

[57] ABSTRACT

A metal detector circuit of the balanced induction type is utilized to detect hidden metal objects. A receive signal is provided with two fixed concurrent phase shifts relative to the transmit signals. Each of the phase shifted receive signals is synchronously demodulated to produce first and second vector signals. The vector signals are combined in a summation circuit to produce a third vector signal. The first and third vector signals are then selectively combined by an operator to produce a fourth vector signal having a desired vector range between minimum and maximum vector angles. The metal detector circuit of the present invention provides a response for objects having a phase response signal outside the selected phase range. The first and fourth vector signals are each differentiated twice then level detected. The outputs from the level detection process are logic signals which are input to an AND gate. The output of the AND gate is a control signal for selectively gating the second differential signal of the fourth vector signal. The output from the circuit provides a response when an object produces a receive signal which is outside the selected exclusion phase angle range.

5 Claims, 7 Drawing Figures

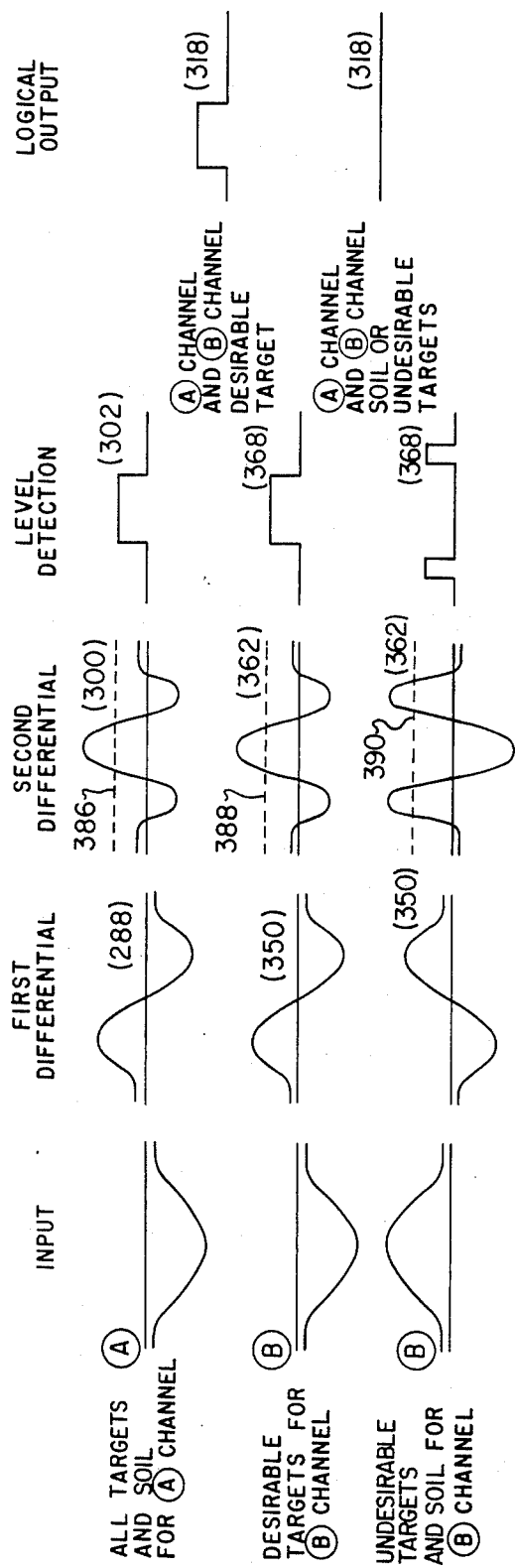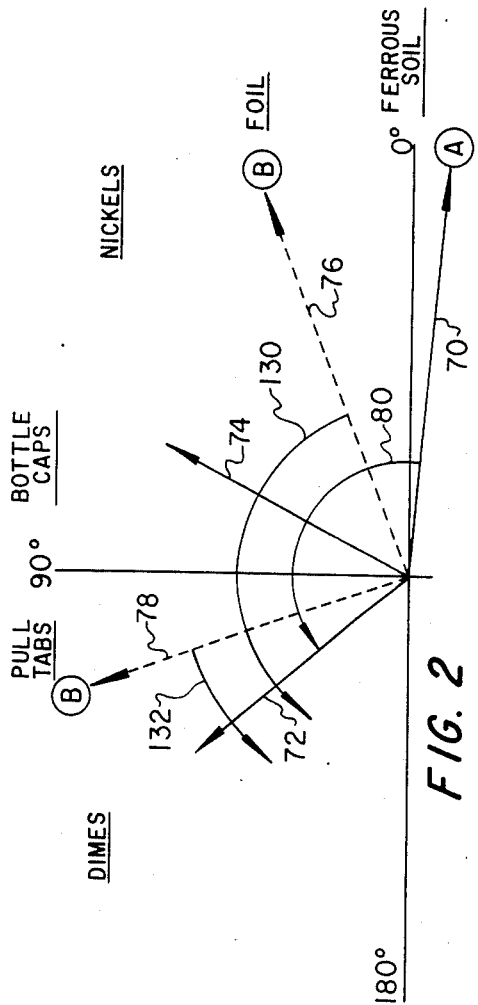
FIG. 7
FIG. 2

METAL DETECTOR CIRCUIT HAVING SELECTABLE EXCLUSION RANGE FOR UNWANTED OBJECTS

TECHNICAL FIELD

The present invention pertains in general to metal detector circuits and in particular to such a circuit which utilizes vector processing of information signals.

BACKGROUND ART

Metal detector circuits find wide application in locating hidden metal objects, particularly when such objects are located just beneath the surface of the ground. A basic technique for detecting such objects is the use of electromagnetic induction. An electromagnetic field is created in a given region where a hidden object may be located. When a metal object is encountered in this region, the field is altered. The change in the field is indicated in a receive signal derived from a coil located in the electromagnetic field. One problem with this method arises when the target object is located within soil that contains ferrous material. Iron oxide is a typical ferrous material and is very widely distributed on the surface of the earth. It is very common to encounter ferrous material in the process of searching for hidden objects. The ferrous material produces a change in the receive signal which can mask the target signal or produce a false indication of a target.

In many locations a desired object may be located among scattered undesired objects which can produce a response to an electromagnetic induction metal detector. Such undesired objects include pull tabs, bottle caps, aluminum foil, nails and small pieces of iron. Since the unwanted objects typically outnumber the desired objects, it is necessary to provide discrimination between the various types of objects which may be located in the desired region to be searched. It has been discovered that different types of materials produce different phase responses for the receive signal. These different phase responses can be used as a means to discriminate between various types of objects so that there is a greater probability that the desired type of object will be located rather than a piece of junk, such as a bottle cap. Such phase discrimination circuits are shown, for example, in U.S. Pat. Nos. 4,128,803, 3,676,772 and 4,303,879. However, the circuits heretofore used have operated on a principle of discriminating on the basis of a particular phase angle in the receive signal. Since by its very nature in searching for unknown objects, the operator does not know what may be in the search region. He may possibly select a circuit setting that may not respond to a particular type of desired object or may not reject a particular type of unwanted object. Conventional phase discrimination circuits can be helpful but likewise can serve to mislead the operator when an indication of a target is received.

In view of the problems regarding the detection of metal objects by use of electromagnetic induction, there exists a need for an improved metal detector circuit and method for detecting metal objects, particularly in a background of ferrous soil and unwanted metal, by having a selectable range of phase responses for acceptance and rejection.

SUMMARY OF THE INVENTION

A particular embodiment of the present invention comprises a method for detecting a selected class of metal objects within a background of various types of metal objects and ferrous material. The method includes the step of producing an electromagnetic field in response to a reference signal. A receive signal is derived from the electromagnetic field wherein the phase angle of the receive signal relative to the reference signal is a function of material and objects in the region of the electromagnetic field. First and second vector signals are produced from the reference signal and the receive signal. Each of the vector signals has a predetermined phase angle relative to the reference signal. The vector signals define the limits of a phase angle range. The phase angle range of the vector signals is selected such that the predetermined class of desireable metal objects produces a receive signal having a phase angle outside the phase angle range. The first and second vector signals are differentiated to produce respective first and second differentiated signals. The first and second differentiated signals are threshold detected to produce respective first and second logic signals. The logic signals are compared to produce a control signal when the logic signals have a predefined logic state. A data signal is derived from the receive signal and the reference signal and is gated to an output circuit in response to the control signal for producing an indication of the detection of objects in the predetermined class of metal objects in the electromagnetic field.

BRIEF DESCRIPTION OF THE DRAWINGS

For a more complete understanding of the present invention and the advantages thereof, reference is now made to the following description taken in conjunction with the accompanying drawings in which:

FIG. 2 is a vector diagram representing the various information signals produced and processed in the circuit of the present invention, FIG. 7 is an illustration of various signal waveforms present in the selected embodiment of the circuit of the present invention.

DETAILED DESCRIPTION

Figure 1:
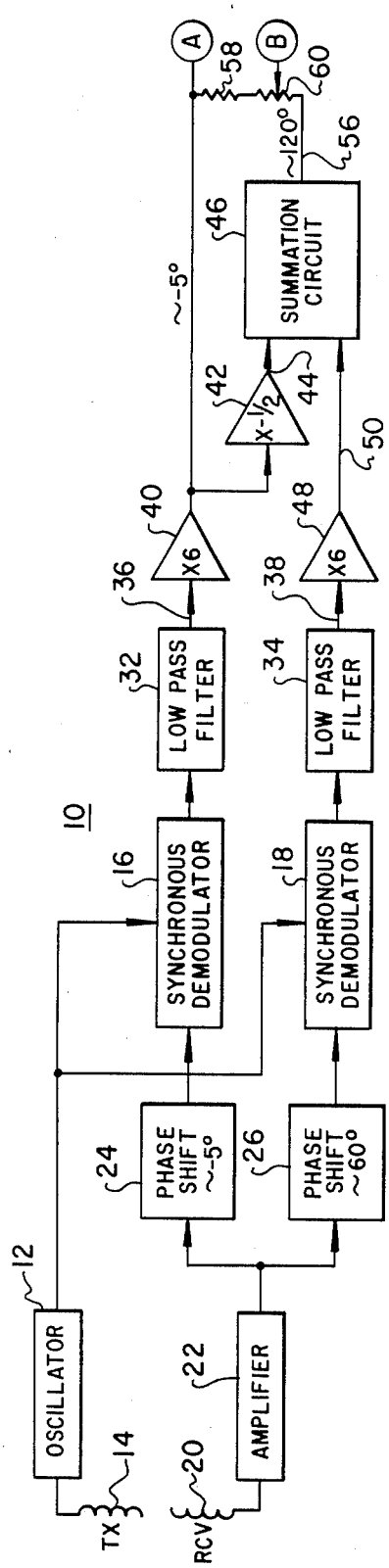
FIG. 1 is a functional block diagram of a first portion of the circuit of the present invention.

Referring now to FIG. 1 there is illustrated a functional block diagram for a first section 10 of the circuit of the present invention. The circuit in FIG. 1 produces first and second vector signals which are used for the detection and rejection of selected materials in accordance with the present invention. Section 10 includes an oscillator 12 which produces a transmit signal, also referred to as a reference signal, having a frequency of approximately 5 Khz. The transmit signal produced by oscillator 12 is provided to a transmit coil 14 which produces an electromagnetic field in the region of the coil 14 when the transmit signal is passed through the coil. The transmit signal from oscillator 12 is further provided to the control inputs of synchronous demodulators 16 and 18.

A receive coil 20 is positioned within the electromagnetic field produced by the transmit coil 14. A receive signal is produced within coil 20. The receive signal is amplified by amplifier 22 and then provided to phase shift circuits 24 and 26. Circuit 24 provides a few degrees of lag, approximately 5°, for the receive signal. Circuit 26 provides approximately 60° of lead angle. The phase shifted receive signal from circuit 24 is provided as the signal input to synchronous demodulator 16. The phase shifted signal from circuit 26 is provided as the signal input to synchronous demodulator 18.

The synchronous demodulators 16 and 18 provide phase demodulation of the phase shifted receive signals. The output of demodulator 16 is provided to a low pass filter 32 and the output of synchronous demodulator 18 is provided to a low pass filter 34.

The output of filter 32 at line 36 is termed a first vector signal. This first vector signal has a DC amplitude and corresponds to a particular phase angle of a component of the receive signal. It is therefore a vector quantity. Likewise, the output of low pass filter 34 at a line 38 is a vector signal which is termed a second vector signal.

The first vector signal at line 36 is input to an amplifier 40 which preferably has a gain of approximately 6. The output of the amplifier 40 is then passed through an amplifier 42 which has a gain of approximately $-\frac{1}{2}$. The output of ampliflier 42 is transmitted through a line 44 to a first input of a summation circuit 46.

The second vector signal at line 38 is provided as an input to an amplifier 48 which has a gain of approximately 6. The amplifier second vector signal from amplifier 48 is transmitted through a line 50 as the second input to the summation circuit 46.

The amplified second vector signal from amplifier 40 is provided to a terminal A. This signal has a slight phase lag but is near 0° relative to the transmit signal. Within the summation circuit 46 the vector signals received at lines 44 and 50 are combined in a vector summation to produce a third vector signal which has a phase lead angle of approximately 120°. This third vector signal is transmitted through a line 56.

A resistor 58 and a potentiometer 60 are connected in series between terminal A and line 56. The wiper of potentiometer 60 is connected to a terminal B. The resistance element of potentiometer 60 is substantially greater than that of the resistor 58. The signal produced at the wiper of potentiometer 60 is a selective combination of the vector signals at terminal A and line 56. The vector signal produced at terminal B can be anywhere in the range of approximately 0° to 120°.

Figure 5:
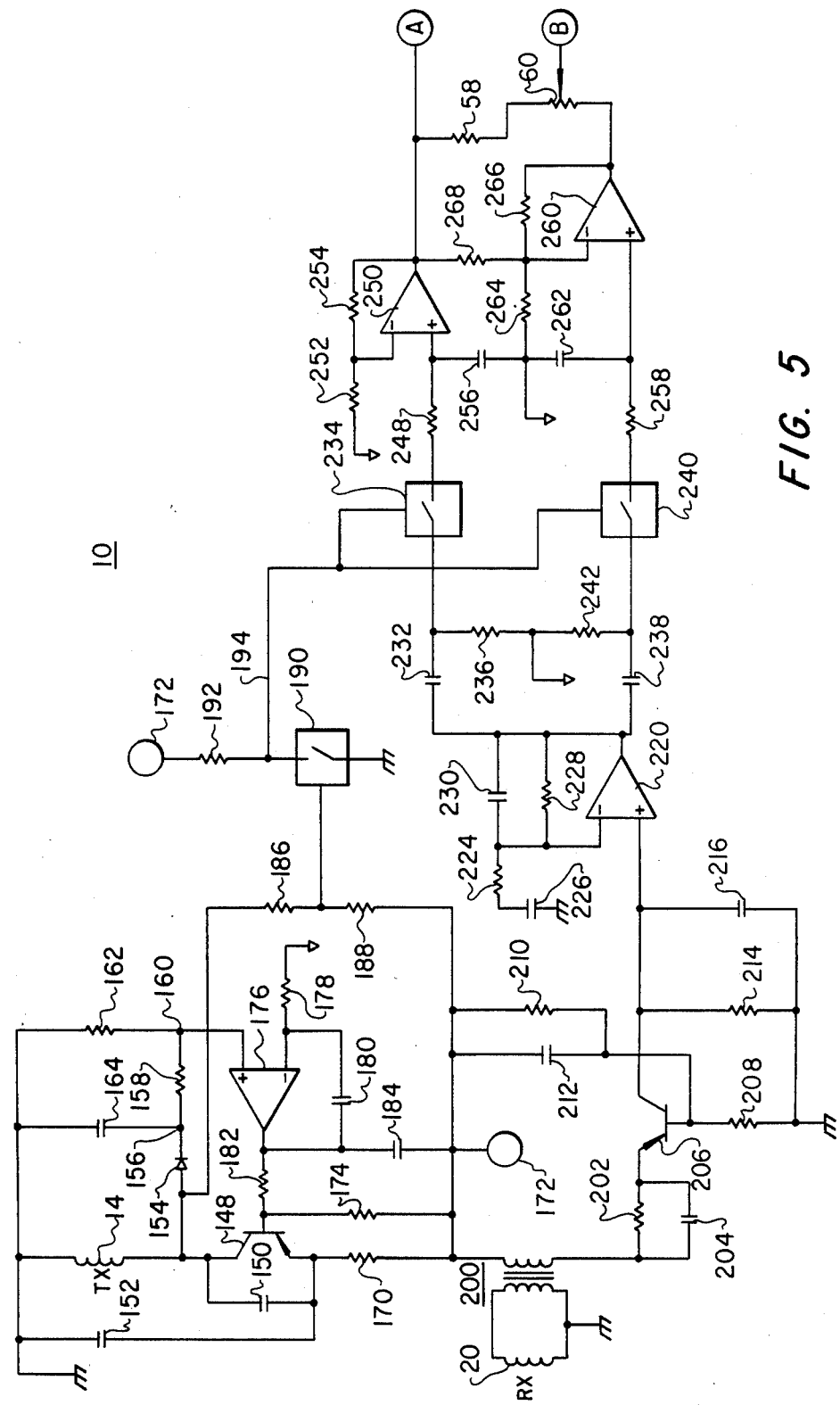
FIG. 5 is a detailed schematic diagram of a selected embodiment of the present invention corresponding to the block diagram portion shown in FIG. 1.

A detailed schematic illustration for the circuit shown in FIG. 1 is illustrated in FIG. 5.

The various vector signals described above in reference to FIG. 1 are illustrated in FIG. 2 within a coordinate system. The coordinate system shows the relative phases of signals with respect to the transmit (reference) signal. A vector 70 represents the first vector signal at terminal A. This vector just slightly lags the 0° angle by about 5°. A vector 72 represents the vector signal at line 56. The vector 72 is at a lead angle of approximately 120°. A vector 74 represents the vector signal at line 50. The vector 74 has a lead angle of approximately 60°. The vector signal at terminal B is adjustable. It is shown, for example, as vectors 76 and 78. The vector signal at terminal B can be adjusted anywhere in the range between vectors 70 and 72 as indicated by the arrow 80.

The receive signals, the vector signals discussed above, have a phase response that is related to the type of material that is within the electromagnetic field produced by the transmit coil 14 The phase responses of the receive signal are shown for various types of material with progressively increasing phase shown for ferrous soil, foil, nickels, bottle caps, pull tabs and dimes. The vector signal at terminal B can be adjusted to provide any desired exclusion range for target types, as is further described below. For example, if the signal at terminal B corresponds to the vector 76, the metal detector circuit of the present invention excludes any response for foil or ferrous soil but provide a response for the remaining items comprising nickels, bottle caps, pull tabs and dimes. But if the vector signal at terminal B corresponds to vector 78, all types of items other than dimes and equivalent targets would be excluded and a response would be generated only for such desired targets. The circuitry for providing this selective response is further described in FIG. 3.

Figure 3:
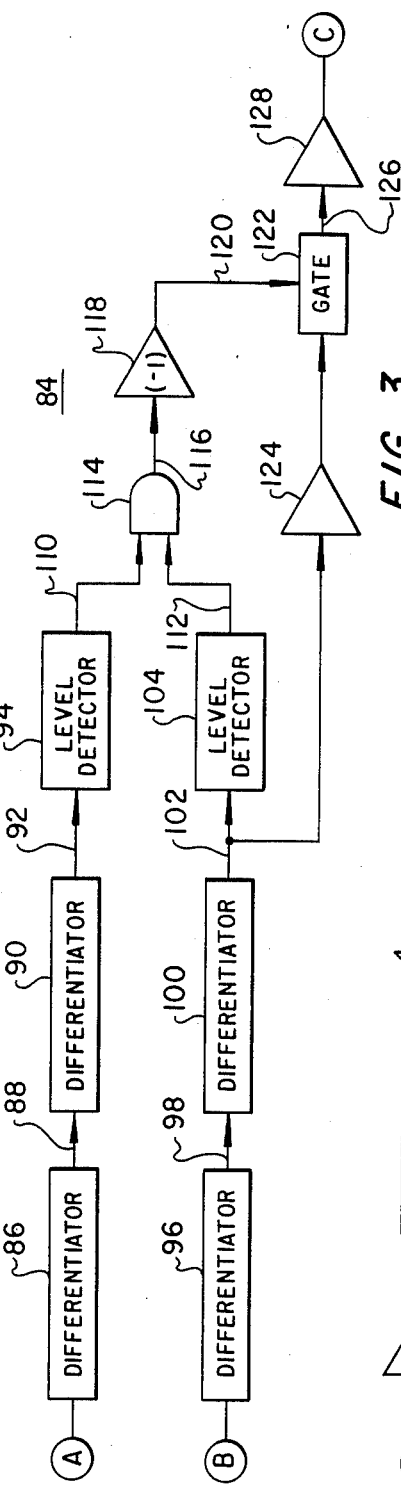
FIG. 3 is a functional block diagram of a second portion of the metal detector circuit of the present invention.

A further functional description of the present invention is shown in FIG. 3 which illustrates a second section 84 of the circuit of the present invention. The vector signal at terminal A is provided to a first differentiator 86. A first differential signal of the first vector signal is produced at line 88 where it is provided to a second differentiator 90. A second differential signal is produced at a line 92 where it is provided to a level detector 94.

The vector signal at terminal B is likewise provided to a first differentiator 96 which produces a first differential signal at a line 98. The first differential signal is input to a second differentiator 100 which produces a second differential signal at a line 102. The second differential signal at line 102 is input to a level detector 104.

The level detectors 94 and 104 receive a reference signal which is preferably a positive voltage of approximately 5 millivolts.

When the input to the level detectors 94 and 104 exceeds the reference voltage, the output from the level detectors goes to a high state. Likewise when the input is below the reference voltage, the output goes to a low voltage state. These outputs from the level detectors 94 and 104 are termed logic signals. The logic signals from detectors 94 and 104 are transmitted respectively through lines 110 and 112 to the inputs of an AND gate 114 to produce a control signal at a line 116.

The control signal at line 116 is transmitted through an inverting amplifier 118 to a line 120 which is connected to the control input of a gate 122.

The second vector second differential signal at line 102 is passed through amplifier 124 to the input of gate 122. This second differential signal is selectively passed through gate 122 in response to the control signal provided at line 120. The output from the gate 122 is passed through a line 126 to an amplifier 128 where it is provided to a terminal C. Further referring to FIG. 2, the signal at terminal C is a response which falls outside the phase range between the vector signal for terminal B and the minimum angle vector 70. Using vector 76 as an example of the vector signal for terminal B, the response at terminal C is in the range indicated by an arrow 130. For the vector 78 representing the vector signal at terminal B, the response at terminal C is in the range indicated by an arrow 132. There is an exclusion phase angle range between vector 70 and the vector signal at terminal B.

Figure 4:
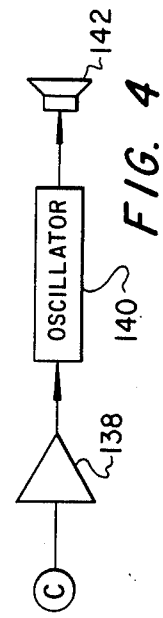
FIG. 4 is a functional block diagram of the output section of the metal detector of the present invention.

The output circuitry for the metal detector of the present invention is shown in FIG. 4. The signal at terminal C is input to an amplifier 138. The output for the amplifier 138 is input to modulate an oscillator 140. The modulated output of the oscillator 140 is provided through a speaker 142 which produces a tone output when an object outside the exclusion phase angle range is located within the electromagnetic field of the coils 14 and 20. A meter may be used in place of the speaker 142.

A detailed schematic diagram for the circuit 10 is shown in FIG. 5. A transistor 148 functions as the central element of the oscillator 12. A capacitor 150 is connected between the collector and emitter terminals of transistor 148. The coil 14 is connected between the collector terminal of transistor 148 and the circuit ground. A capacitor 152 is connected between the circuit ground and the emitter terminal of transistor 148.

In the schematic illustrations, three diagonal lines represents the circuit ground and a downward facing arrow represents an intermediate reference voltage for the analog amplifiers known as the reference ground.

A diode 154 is connected between the collector terminal of transistor 148 and a node 156. A resistor 158 is connected between the node 156 and a node 160. A resistor 162 is connected between the circuit ground and node 160. A capacitor 164 is connected between the circuit ground and node 156.

A resistor 170 is connected between the emitter terminal of transistor 148 and a power terminal 172 which is preferably at +12.5 volts. A resistor 174 is connected between the base terminal of transistor 148 and the power terminal 172.

A differential amplifier 176 has the noninverting input thereof connected to node 160. A resistor 178 is connected between reference ground and the inverting input of amplifier 176. A capacitor 180 is connected between the output and the inverting input of amplifier 176. A resistor 182 is connected between the base terminal of transistor 148 and the output of amplifier 176. A capacitor 184 is connected between the output of amplifier 176 and the power terminal 172.

Resistors 186 and 188 are connected in series between the collector terminal of transistor 148 and the power terminal 172. The transmit signal produced by the oscillator is passed through resistor 186 to the control input of a switch 190 which is a solid state switch such as a field effect transistor. A resistor 192 is connected between power terminal 172 and the output of switch 190. The input of switch 190 is connected to the circuit ground. The output of switch 190 at a line 194 is a bilevel signal in phase synchronism with the transmit signal that is provided to transmit coil 14.

The receive coil 20 is connected in parallel with the primary coil of a transformer 200. One terminal of the receive coil 20 is connected to the circuit ground. The secondary coil of the transformer 200 has one terminal connected to the power terminal 172. The second terminal is connected to a first terminal of the parallel combination of a resistor 202 and a capacitor 204. A transistor 206 has the emitter terminal thereof connected to the second terminal of the parallel combination of resistor 202 and capacitor 204. A resistor 208 is connected between the base terminal of transistor 206 and the circuit ground. A parallel combination of a resistor 210 and a capacitor 212 is connected between the power terminal 172 and the base terminal of the transistor 206. The transistor 206 is a central component of the amplifier 22 shown in FIG. 1.

A parallel combination of a resistor 214 and a capacitor 216 is connected between the collector terminal of transistor 206 and the circuit ground.

A differential amplifier 220 has the noninverting input thereof connected to the collector terminal of the transistor 206. A series combination of a resistor 224 and a capacitor 226 is connected between the circuit ground and the inverting input of amplifier 220. The parallel combination of a resistor 228 and a capacitor 230 is connected between the output and the inverting input of amplifier 220.

A capacitor 232 is connected between the output of amplifier 220 and the input to a switch 234. A resistor 236 is connected between the input of switch 234 and the reference ground. The combination of capacitor 232 and resistor 236 corresponds to the phase shift circuit 24 shown in FIG. 1.

A capacitor 238 is connected between the output of amplifier 220 and the input of a switch 240. A resistor 242 is connected between the input of switch 240 and the reference ground. The combination of the capacitor 238 and the resistor 242 corresponds to the phase shift circuit 26 shown in FIG. 1.

The switches 234 and 240 correspond respectively to the synchronous demodulators 16 and 18 shown in FIG. 1. These switches can be field effect transistors.

The phase demodulated output of switch 234 is transmitted through a resistor 248 to the noninverting input of a differential amplifier 250. A resistor 252 is connected between the inverting input of amplifier 250 and the reference ground. A resistor 254 is connected between the output and the inverting input of amplifier 250. A capacitor 256 is connected between the noninverting input of amplifier 250 and the reference ground. The combination of resistor 248 and capacitor 256 functions as the low pass filter 32 shown in FIG. 1.

A resistor 258 is connected between the output of switch 240 and the noninverting input of a differential amplifier 260. A capacitor 262 is connected between the reference ground and the noninverting input of amplifier 260. The combination of the resistor 258 and the capacitor 262 functions as the low pass filter 34 shown in FIG. 1.

A resistor 264 is connected between the reference ground and the inverting input of amplifier 260. A resistor 266 is connected between the output and the inverting input of amplifier 260. A resistor 268 connects the output of amplifier 250 to the noninverting input of amplifier 260. The combination of amplifier 260 together with resistors 264, 266 and 268 serve the function of amplifiers 42 and 48 together with the summation circuit 46 which are shown in FIG. 1.

The resistor 58 is connected in series with the potentiometer 60 between the terminal A and the output of amplifier 260. As described above the wiper of resistor 60 is selectively adjusted to provide a desired vector signal which is transmitted through terminal B.

Figure 6:
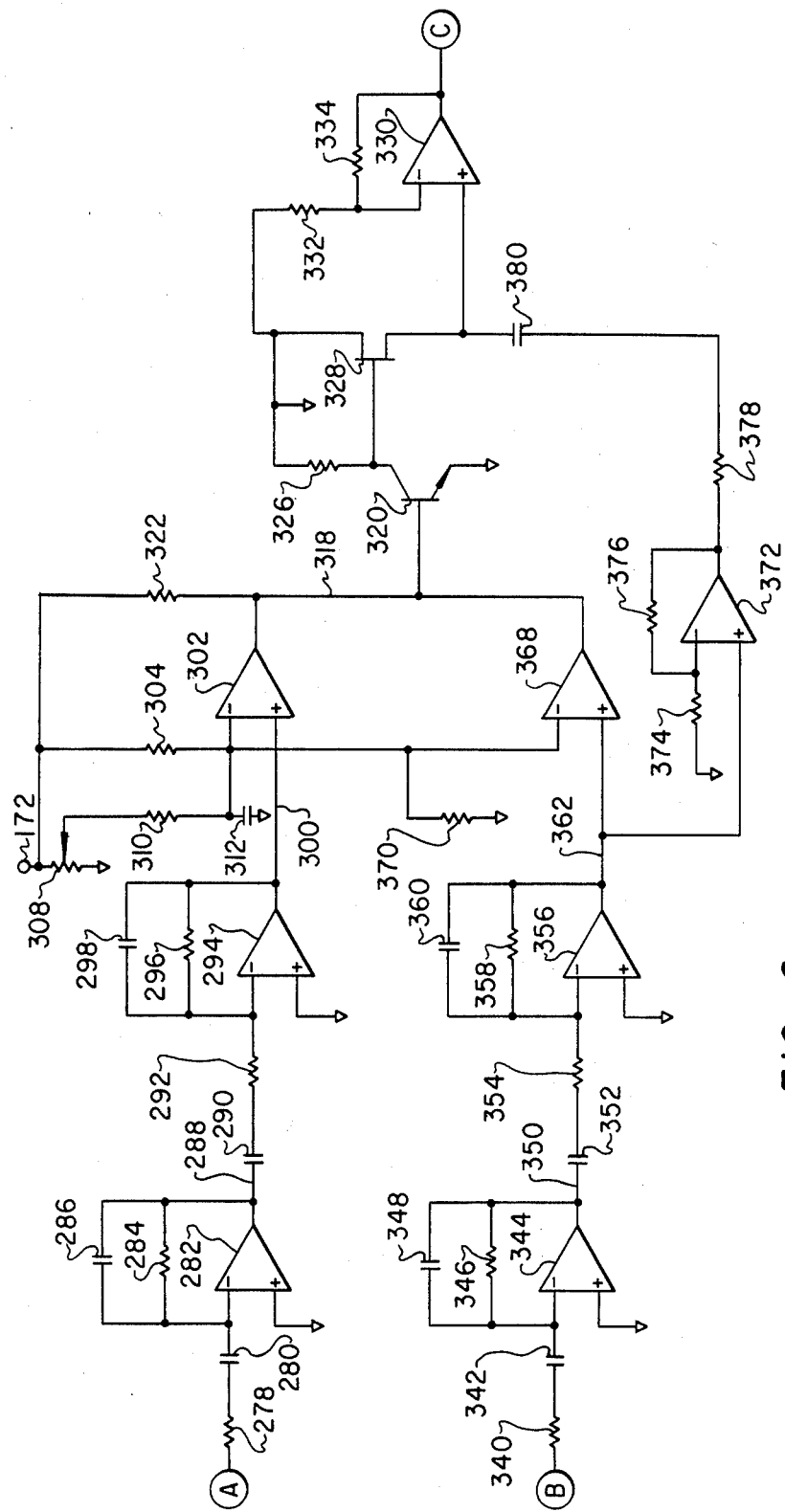
FIG. 6 is a detailed schematic diagram for a selected embodiment of the present invention corresponding to the functional block diagram shown in FIG. 3.

A detailed schematic diagram for the functional block diagram section 84 shown in FIG. 3 is illustrated in FIG. 6. The vector signal at the A terminal is transmitted through the series combination of a resistor 278 and a capacitor 280 to the inverting input of a differential amplifier 282. The noninverting input of amplifier 282 is connected to the reference ground. A parallel combination of a resistor 284 and a capacitor 286 is connected between the output and the inverting input of amplifier 282. The amplifier 282 together with its associated circuitry corresponds to the differentiator 86 shown in FIG. 3. A first differential signal is produced at a line 288 at the output of amplifier 282.

The first differential signal at line 288 is transmitted through the serial combination of a capacitor 290 and a resistor 292 to the inverting input of a differential amplifier 294. The noninverting input of amplifier 294 is connected to the reference ground. A parallel combination of a resistor 296 and a capacitor 298 is connected between the output and the inverting input of amplifier 294. The amplifier 294 together with its associated circuitry corresponds to the differentiator 90 shown in FIG. 3. The output of amplifier 294 at a line 300 comprises a second differential signal of the vector signal at terminal A.

The signal at line 300 is provided as the noninverting input to a differential amplifier 302 which serves the function of the level detector 94 shown in FIG. 3. A resistor 304 is connected between a power terminal 172 and the inverting input of amplifier 302. Power terminal at 172 is preferably at +10 volts. A potentiometer 308 is connected between the power terminal 172 and the reference ground. A resistor 310 is connected between the wiper terminal of potentiometer 308 and the inverting input of amplifier 302. A capacitor 312 is connected between the reference ground and the inverting input of amplifier 302.

The amplifier 302 produces a logic signal output which is transmitted through line 318 to the base terminal of a transistor 320. A resistor 322 is connected between power terminal 172 and the line 318. The emitter terminal of transistor 320 is connected to the reference ground. A resistor 326 is connected between the reference ground and the collector terminal of transistor 320.

A junction field effect transistor 328 has the gate terminal thereof connected to the collector terminal of transistor 320. The source terminal of transistor 328 is connected to the reference ground. The drain terminal of transistor 328 is connected to the noninverting input of a differential amplifier 330. A resistor 332 is connected between the reference ground and the inverting input of amplifier 330. A resistor 334 is connected between the output and the inverting input of amplifier 330. The amplifier 330 corresponds to the amplifier 128 shown in FIG. 3.

The combination of amplifiers 302 and 330, transistors 320 and 328 and associated circuitry functions as the level detector 94, AND gate 114, amplifier 118 and gate 122.

Further referring to FIG. 6, the vector signal at the B terminal is transmitted through the serial combination of a resistor 340 and a capacitor 342 to the inverting input of a differential amplifier 344. The noninverting input of amplifier 344 is connected to the reference ground. A parallel combination of a resistor 346 and a capacitor 348 is connected between the output and the inverting input of amplifier 344. The amplifier 344 together with its associated circuitry functions as the differentiator 96 shown in FIG. 3. A first differential signal is produced at a line 350 at the output of amplifier 344.

The first differential signal at line 350 is transmitted through the series combination of a capacitor 352 and a resistor 354 to the inverting input of a differential amplifier 356. The noninverting input of amplifier 356 is connected to the reference ground. A parallel combination of a resistor 358 and a capacitor 360 is connected between the output and the inverting input of amplifier 356. The amplifier 356 together with its associated circuitry functions as the differentiator 100 shown in FIG. 3. The output of amplifier 356 at a line 362 is a second differential signal of the vector signal input at terminal B.

The second differential signal at line 362 is provided to the noninverting input of a differential amplifier 368 which has the output thereof connected to line 318. A resistor 370 is connected between the reference ground and the inverting inputs of amplifiers 302 and 368. The combination of the amplifier 368 and its associated circuitry functions as the level detector 104 shown in FIG. 3. The reference signal supplied for the level detectors 94 and 104 is provided by the combination of resistor 304 and 370.

The second differential signal at line 362 is further provided to the noninverting input of a differential amplifier 372. A resistor 374 is connected between the circuit ground and the inverting input of amplifier 372. A resistor 376 is connected between the output and the inverting input of amplifier 372. The amplifier 372 and its associated circuitry corresponds to the amplifier 124 shown in FIG. 3. The output of amplifier 372 is transmitted through the series combination of a resistor 378 and a capacitor 380 to the noninverting input of amplifier 330.

Representative signal waveforms for the circuits shown in FIG. 6 are illustrated in FIG. 7. For each waveform there is a reference numeral representing the location of the waveform in FIG. 6. The upper sequence of waveforms represents the processing in the A channel which corresponds to the A terminal input. The lower two sequences represent two different situations for the B channel which corresponds to the B terminal input. The first column represents the input signal to the two channels at respective input terminals A and B. The second column represents the first differential signal for each of the channels. The third column represents the second differential signal for each of the channels. The fourth column shows the logic level signals produced as a result of the level detection. The fifth column represents the two situations for producing gating signals as a result of the two different signals input to channel B.

Further referring to FIGS. 6 and 7, the vector signal at terminal A represents the response as a search head, which includes the coils 14 and 20, is manually swept from one location to another over the surface of the earth. The sweep length is typically in the range of 4 to 6 feet. If there is no object in the sweep field there will be no response produced at terminal A or terminal B other than a "soil" response. If there is a conductive object within the sweep field then signals, either positive or negative will be produced in the channels A and B.

Operation of a metal detector circuit of the present invention is now described in reference to the Figures. First referring to FIGS. 1, 2 and 3. The metal detector of the present invention functions as a balanced induction circuit. The coil 20 is configured such that no signal or a small signal is induced in the coil from the field created by the transmit coil 14. However in the presence of a conductive or magnetic target, the field is altered and a receive signal is induced within the coil 20. The receive signal from coil 20 is at the same frequency as the transmit signal produced by oscillator 12, however, the phase of the receive signal is a function of the type of material within the electromagnetic field. Ferrous materials such as bits of iron and distributed iron oxide in the soil typically have a low phase shift in the vicinity of 0°. Conductive but nonferrous materials typically have a much greater phase shift. This is illustrated for various types of objects in FIG. 2.

The receive signal from amplifier 22 is phase shifted slightly by the phase shift circuit 24. The circuit 24 applies a lag of several degrees. The receive signal is provided with approximately a 60° lead by the phase shift circuit 26. These phase shifts are both relative to the transmit signal produced by the oscillator 12. Each of the phase shifted signals is phase demodulated by the respective synchronous demodulator 16 or 18. The transmit signal from the oscillator 12 is the demodulation reference. The demodulated signals are passed through low pass filters 32 and 34 to produce DC level signals. The signals at lines 36 and 38 are vector signals since each represents a magnitude and a respective phase angle. Each of the vector signals is multiplied by a factor of 6. The 60° signal is input directly to the summation circuit 46. The approximate 0° signal is inverted, multiplied by one half and input to the summation circuit 46. The resulting vector at line 56 has a phase angle of approximately 120° and is represented by vector 72 in FIG. 2. The approximate 0° vector signal at terminal A is represented by the vector 70 in FIG. 2.

The vectors at terminal A and line 56 are selectively combined by operation of the potentiometer 60 to produce a vector signal at terminal B. This resulting vector signal can have a phase angle anywhere in the range between vector 70 and vector 72 wherein this phase range is indicated by the arrow 80. The potentiometer 60 is selected by the operator to determine the nature of the targets for which he desires to have a response. Further referring to FIG. 2, the phase range from vector 70 to the selected vector at terminal B is an exclusion range. No output is produced for any targets within the exclusion range. But in the range from the vector signal for the terminal B up to and beyond the vector 72, such is shown by arrows 130 and 132, the targets within this range will produce a response at the output of the metal detector circuit of the present invention. For example, the operator can select vector 76 to reject foil and ferrous soil but receive responses for nickels, bottle caps, pull tabs and dimes, as well as other objects in this range not shown in FIG. 2. If the operator desires to be much more selective, the vector 78 can be selected as the vector signal for the terminal B. In this circumstance no response is generated for ferrous soil, foil, nickels, bottle caps or pull tabs. However, a response is generated for dimes and equivalent objects within the phase range 132.

Further operation of the circuit is described in reference to FIGS. 3, 6 and 7. The inputs at terminals A and B for various examples is shown in the first column in FIG. 7. For terminal A there will be produced a negative response for a sweep whether there is encountered a target or ground signal, produced by ferrous soil. This corresponds to the approximately 0° phase angle of the signal at terminal A. In the middle row of the first column in FIG. 7 there is shown the response at terminal B for a desirable target. The desirable target is any object that is outside the phase range between the vector signal for terminal B and the A terminal vector 70. In the bottom row in FIG. 7 in the left column, there is shown the response of ground, ferrous soil, as a result of a sweep of the coils 14 and 20. The soil signal is within the exclusion phase angle range. The ground signal is a positive qoing signal at terminal B.

The first differential signal for the A terminal channel is at line 288. It is the first derivative, inverted, of the signal at terminal A. The inversion is due to the input of the terminal A signal at the inverting input of the differential amplifier 282. First differential signals are also shown for the desirable targets and ground signal for the B channel at line 350.

The second differential signal is shown in the third column from the left. This signal is present at line 300 for the A terminal channel and at line 362 for the B terminal channel. The threshold level for the second differential signal is indicated by levels 386, 388 and 390. When the signal at line 300 exceeds the threshold level 386, a pulse is produced at amplifier 302 as shown in the level detection column in FIG. 7. Likewise at line 362, when the signal exceeds the threshold level 388, there is produced a pulse at the output of amplifier 368. In the situation for the lower row, ground or reject material for terminal B channel, the second differential signal may exceed the threshold level 390, however, it will not correlate with the signal in 302.

The AND function carried out by amplifiers 302 368 and transistor 320 is indicated in the logical output column in FIG. 7. This is a positive pulse at line 318. A high level at this line is the result of both of the inputs to the amplifiers 302 and 368 being a high level voltage at the same time. This is a result of the open collector configuration of the output of the amplifiers 302 and 368. If either amplifier has the noninverting input at a low level, below the threshold level, the line 318 will be pulled to a low voltage state. It is not pulled to a high voltage state through the resistor 322 unless both of amplifiers 302 and 368 have a high voltage level output.

The situation for the A terminal channel and the B terminal channel both having ground or undesirable targets is shown in the logical output column at the bottom. This is a no response at line 318 since the input to amplifier 368 does not exceed the reference threshold at the same time as the input on line 300 exceeds the threshold.

Only in the situation for the positive pulse output at line 318, the logical output column in FIG. 7, is there produced an output from the metal detector circuit of the present invention. This is a gate control pulse. When the gate control pulse is produced at line 318, the second differential signal from line 362 is gated to the output terminal C. However, any data signal derived from the recive signal can be gated to the output in place of the signal at line 362. The signal at line 362 is passed through amplifier 372, resistor 378 and a capacitor 380 to the noninverting input of amplifier 330. The gating action is essentially a shunt. When transistor 320 is off, the result of a low voltage state at line 318, the gate of transistor 328 is pulled to a high voltage state thereby turning on transistor 328 which fixes the voltage at the noninverting input of amplifier 330. This prevents any signal from passing through the amplifier 330 to the output terminal C. But when the voltage at line 318 goes to a high state, the transistor 320 is turned on pulling the gate terminal of transistor 328 essentially to circuit ground. This turns off transistor 328 thereby permitting the signal from the output of amplifier 372 to be supplied to the noninverting input of amplifier 330. The signal is then passed to the output terminal C where it subsequently modulates the oscillator 140 to produce a tone at the speaker 142.

In summary, the present invention in the illustrated embodiment comprises a metal detector circuit which has phase demodulation for two different, but fixed, phase shifts for the receive signal. A new phase signal is produced by a combination of the two phase signals. The new phase signal is combined selectively with one of the original phase signals to produce a specific phase range of rejection and a specific phase range of target acceptance. An operator of this metal detector circuit is provided with a much more versatile and responsive circuit for the detection of hidden metal objects.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope of the invention.

I claim:

1. A method for detecting selected metal objects in a background of other metal and ferrous materials, comprising the steps of:

producing an alternating transmit signals, producing an electromagnetic field by passing said transmit signal through a transmit coil, producing a received signal in a receive coil located in said electromagnetic field, providing a first fixed relative phase shift between said transmit signal and said received signal, phase demodulating said received signal having said first fixed relative phase shift, with respect to said transmit signal, to produce a first vector signal, providing a second fixed relative phase shift between said transmit signal and said received signal, phase demodulating said received signal having said second fixed relative phase shift, with respect to said transmit signal, to produce a second vector signal, selectively combining said first vector signal and said second vector signal to produce a third vector signal, differentiating said first vector signal to produce a first vector differential signal, differentiating said first vector differential signal to produce a first vector second differential signal, differentiating said third vector signal to produce a third vector differentiated signal, threshold detecting said first vector differential signal to produce a first logic signal, threshold detecting said third vector differentiated signal to produce a second logic signal, logically combining said first and second logic signals to produce a gate control signal, and gating said third vector differentiated signal in response to said gate control signal to selectively pass said third vector differentiated signal to an output circuit for producing an indication of the detection of said selected metal objects within said background of other metal and ferrous materials.

2. A method for detecting selected metal objects in a background of other metal and ferrous materials, comprising the steps of:

producing an alternating transmit signal, producing an electromagnetic field by passing said transmit signal through a transmit coil, producing a received signal in a receive coil located in said electromagnetic field, providing a first fixed relative phase shift between said transmit signal and said received signal, phase demodulating said received signal having said first fixed relative phase shift, with respect to said transmit signal, to produce a first vector signal, providing a second fixed relative phase shift between said transmit signal and said received signal, phase demodulating said received signal having said second fixed relative phase shift, with respect to said transmit signal, to produce a second vector signal, selectively combining said first vector signal and said second vector signal to produce a third vector signal, differentiating said first vector signal to produce a first vector differentiated signal, differentiating said third vector differential signal to produce a third vector second differential signal, threshold detecting said first vector differentiated signal to produce a first logic signal, threshold detecting said third vector second differential signal to produce a second logic signal, logically combining said first and second logic signals to produce a gate control signal, and gating said third vector second differential signal in response to said gate control signal to selectively pass said third vector second differential signal to an output circuit for producing an indication of the detection of said selected metal objects within said background of other metal and ferrous materials.

3. A metal detector circuit for locating selected metal objects in a background of other metal objects and ferrous material, comprising:

an oscillator for producing a first transmit signal, means responsive to said transmit signal for producing an electromagnetic field, means for producing a receive signal derived from said electromagnetic field, means for concurrently applying first and secod fixed relative phase shifts between said transmit signal and said receive signal to produce first and second phase shifted receive signals, means for phase demodulating said first and second phase shifted receive signals, with respect to said transmit signal, to produce first and second vector signals, means for combining said first and second vector signals to produce a third vector signal, a first differentiator circuit for differentiating said first vector signal to produce a first vector differential signal, a second differentiator circuit for differentiating said first vector differential signal to produce a first vector second differential signal, means for threshold detecting said first vector second differential signal to produce a first logic signal, means for differentiating said third vector signal to produce a third vector differentiated signal, means for threshold detecting said third vector differentiated signal to produce a second logic signal, means for logically combining said first and second logic signals to produce a control signal, and means for gating said third vector differentiated signal in response to said control signal to an output circuit for producing an indication of the detection of said selected metal objects within the background of other metal objects and ferrous materials.

4. A metal detector circuit for locating selected metal objects in a background of other metal objects and ferrous material, comprising:
   an oscillator for producing a first transmit signal,
   means responsive to said transmit signal for producing an electromagnetic field,
   means for producing a receive signal derived from said electromagnetic field,
   means for concurrently applying first and second fixed relative phase shifts between said transmit signal and said receive signal to produce first and second phase shifted receive signals,
   means for phase demodulating said first and second phase shifted receive signals, with respect to said transmit signal, to produce first and second vector signals,
   means for combining said first and second vector signals to produce a third vector signal,
   means for differentiating said first vector signal to produce a first vector differentiated signal,
   means for threshold detecting said first vector differentiated signal to produce a first logic signal,
   a first differentiator circuit for differentiating said third vector signal to produce a third vector differential signal,
   a second differentiator circuit for differentiating said third vector differential signal to produce a third vector second differential signal,
   means for threshold detecting said third vector second differential signal to produce a second logic signal,
   means for logically combining said first and second logic signals to produce a control signal, and
   means for gating said third vector second differential signal in response to said control signal to an output circuit for producing an indication of the detection of said selected metal objects within the background of other metal objects and ferrous materials.

5. A metal detector circuit comprising:
   a transmit coil,
   a receive coil,
   an oscillator connected to said transmit coil for producing an electromagnetic field in the region of said transmit coil, wherein said receive coil is located in said electromagnetic field and said receive coil produces a received signal,
   means for providing a first fixed phase shift for said received signal to produce a first phase shifted signal,
   means for providing a second fixed phase shift for said received signal to produce a second phase shifted signal,
   means for synchronously demodulating said first phaseshifted signal with respect to said transmit signal to produce a first demodulated signal,
   means for synchronously demodulating said second phaseshifted signal with respect to said transmit signal to produce a second demodulated signal,
   means for amplifying said first demodulated sigal to produce a first vector signal,
   means for inverting said first vector signal,
   means for amplifying said second demodulated signal,
   means for summing said inverted first vector signal with said amplified second demodulated signal to produce a second vector signal,
   means for producing a first vector differential signal of said first vector signal,
   means for producing a second vector differential signal of said second vector signal,
   means for threshold detecting said first differential signal to produce a first logic signal,
   means for threshold detecting said second vector differential signal to produce a second logic signal,
   a logical AND circuit having said first and second logic signas as inputs thereto for producing a control signal,
   a gate circuit driven by said control signal for selectively passing said second vector differential signal therethrough to provide a gated signal, and
   an output circuit connected to receive said gated signal and provide an output signal indicating the presence of a target in said electromagnetic field.

* * * * *

UNITED STATES PATENT AND TRADEMARK OFFICE
CERTIFICATE OF CORRECTION

PATENT NO. : 4,700,139

DATED : October 13, 1987

INVENTOR(S) : Robert J. Podhrasky

It is certified that error appears in the above-identified patent and that said Letters Patent is hereby corrected as shown below:

Column 11, line 26, "signals" should read --signal--.

Column 11, line 51, after "vector" insert --second--.

Column 12, line 41, "secod" should read --second--.

Column 14, line 35, "signas" should read --signals--.

Signed and Sealed this

Twenty-sixth Day of April, 1988

Attest:

DONALD J. QUIGG

*Attesting Officer*  *Commissioner of Patents and Trademarks*